United States Patent [19]
Farwell et al.

[11] Patent Number: 5,396,541
[45] Date of Patent: Mar. 7, 1995

[54] CALL HANDOFF IN A WIRELESS TELEPHONE SYSTEM

[75] Inventors: Charles Y. Farwell, Denver; Richard D. Miller, Northglenn; Richard A. Windhausen, Westminster, all of Colo.

[73] Assignee: AT&T Corp., Murray Hill, N.J.

[21] Appl. No.: 965,481

[22] Filed: Oct. 23, 1992

[51] Int. Cl.$^6$ ............................................ H04M 11/00
[52] U.S. Cl. .................................... 379/60; 455/56.1; 375/202
[58] Field of Search ................... 379/59, 60, 63; 455/33.2, 34.1, 51.1, 54.1, 56.1; 375/1; 370/110, 95.1, 95.3

[56] References Cited

U.S. PATENT DOCUMENTS

| | | | |
|---|---|---|---|
| 4,704,734 | 11/1987 | Menich et al. | 455/33.3 |
| 4,737,978 | 4/1988 | Burke et al. | 379/60 |
| 4,850,036 | 7/1989 | Smith | 455/51.1 |
| 4,926,421 | 3/1990 | Kawano et al. | 455/56.1 |
| 5,042,082 | 8/1991 | Dahlin | 370/95.1 |
| 5,081,679 | 1/1992 | Dent | 379/60 |
| 5,121,408 | 6/1992 | Cai et al. | 455/51.1 |
| 5,161,249 | 11/1992 | Meche et al. | 379/60 |
| 5,175,867 | 12/1992 | Wejke et al. | 455/33.1 |
| 5,179,559 | 1/1993 | Crisler et al. | 370/95.1 |
| 5,200,957 | 4/1993 | Dahlin | 370/95.1 |

FOREIGN PATENT DOCUMENTS

| | | | |
|---|---|---|---|
| 0406186 | 1/1991 | European Pat. Off. | H04Q 7/04 |
| 9107036 | 5/1991 | WIPO | H04L 27/30 |

Primary Examiner—Curtis Kuntz
Assistant Examiner—I. Rana
Attorney, Agent, or Firm—John C. Moran

[57] ABSTRACT

Signaling a mobile unit to transmit a synchronization pattern with voice information upon detecting from the signal strength of the wireless mobile unit by a base station that the mobile unit is approaching a minimum threshold. Where the voice information is initially being transmitted in a set of frequency hopping channels using spread spectrum transmission, the synchronization pattern is transmitted in one or more of the set of frequency hopping channels. In addition, the base station alerts a system controller to this fact, and the system controller requests that neighboring base stations monitor the set of frequency hopping channels being transmitted by the mobile unit. In order to synchronize to the mobile unit, the base stations utilize the synchronization pattern to come into synchronization with the mobile unit. The system controller transfers the wireless mobile unit to the base station which is receiving the strongest signal strength.

8 Claims, 5 Drawing Sheets

BASE STATION 103

CALL HANDOFF IN A WIRELESS TELEPHONE SYSTEM

TECHNICAL FIELD

This invention relates to cordless cellular, and PCS telephone systems and more particularly, to an arrangement for determining m which base station a mobile telephone should be handed off.

BACKGROUND OF THE INVENTION

In a cellular communication environment, when a mobile terminal moves from a first cell m a second cell, it is necessary to transfer the mobile terminal's RF communication link with the first cell to the second cell. This operation is commonly called handoff. Most cellular telephone systems in use today divide the available frequency band into channels typically 30 KHz in bandwidth. The cellular system service area is divided geographically into cells of varying sizes. Each cell is controlled by a base station. The available frequency channels the divided into sets with each set usually containing an equal number of channels. The frequency sets the assigned m cells in such a way as m minimize the possibility of co-channel interference. In such a system, when the cell receiver handling the call notices that the receive signal strength from the mobile unit falls below a predetermined threshold value, the cell asks a system controller to determine whether any neighboring cell is receiving the mobile unit's signal with better signal strength than the current cell. The system controller in response to the current cell inquiry sends messages to the neighboring cells with a handoff request which specifies the channel used by the mobile unit. The cells neighboring the current cell employ special scanning receivers which look for the signal from the mobile unit on the specified channel. Should one of the neighboring cells report an adequate signal level to the system controller, the system controller then initiates a handoff from the current cell to the neighboring cell.

In present cellular telephone communication systems, the radio-frequency spectrum allotted is 60 MHz. With such bandwidth, a large number of channels can be dedicated to individual cell-base stations. However, in the Industrial Scientific and Medical (ISM) band, only 26 MHz has been allocated by the Federal Communications Commission (FCC). Further, an implementation of personal communication services (PCS) systems can place a large number of base stations within the same geographic location, e.g., a building. Further, if a frequency-hopping spread spectrum transmission method is utilized to provide PCS systems, the method utilized by the conventional cellular systems of determining The signal strength of the mobile unit cannot be used, since frequency hopping from channel to channel makes it difficult to synchronize with the mobile unit.

The problem then is to determine a method and apparatus which will allow the determination of which cell a mobile unit should be handed off to which will work in the spread spectrum environment and not require the use of reusable dedicated channels.

SUMMARY OF THE INVENTION

This invention is directed to solving this problem and other disadvantages of the prior art. According to the invention, when a base station of a cell detects that the signal strength from the mobile unit is approaching a threshold, the base unit instructs the mobile unit to transmit a synchronization pattern on one or more of a set of frequency hopping channels being used for spread spectrum transmission. In addition, the base station alerts the system controller to this fact, and the system controller requests that neighboring base stations monitor the set of frequency hopping channels being transmitted by the mobile unit. In order to synchronize to the set of frequency hopping channels being used by the mobile unit, the base stations utilize the synchronization pattern in the selected channels to come into synchronization with the mobile unit. The system controller then selects the base station which is receiving the strongest signal strength.

DETAILED DESCRIPTION

Figure 1:
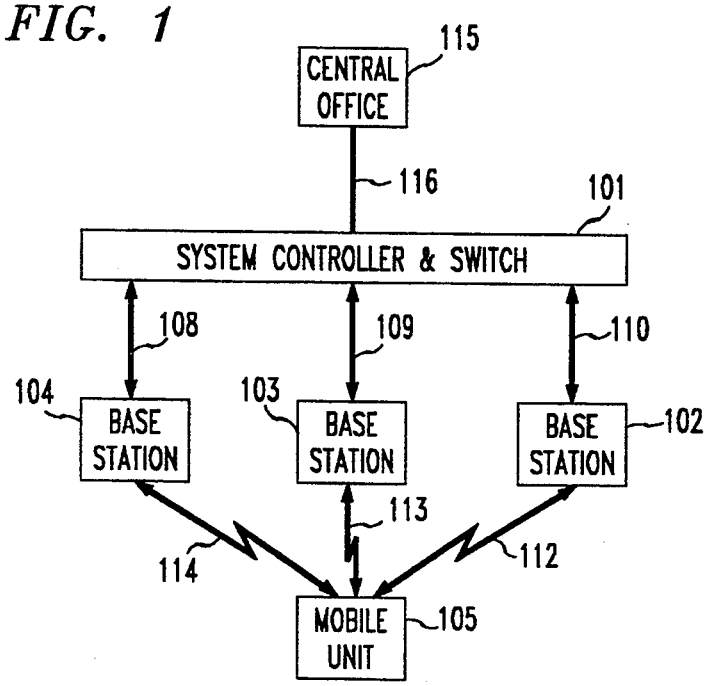
FIG. 1 is a block diagram of a personal communications service system that incorporates an illustrative embodiment of the invention.

FIG. 1 illustrates a wireless communication system designed to provide PCS-type service for a plurality of mobile units such as mobile unit 105. Base stations 102–104 are each capable of maintaining radio links with mobile units, and each base station is interconnected to the system controller and switch 101 via link 109. Advantageously, these links may be primary rate interface (PRI) links as defined for Integrated Services Digital Network (ISDN) communication. System controller and switch 101 provides the control and switching facility for interconnecting base stations with each other via links 108–110 or interconnecting a base station with central office 115 via link 116 and the corresponding digital link for the base station. A link such as 108 may advantageously handle up to 23 different calls. Link 116 maybe a plurality of PRI links. Central office 115 is a central office such as the AT&T 5 ESS. Central office 115 is also interconnected to the public telephone system. System controller and switch 101 may advantageously be the switching system disclosed in the U.S. patent application B. M. Bales, et at. "A Switching System Using Identical Switching Nodes", Ser. No. 07/636521, filed on Dec. 31, 1990, and assigned to the same assignee as the present application. This application of B. M. Bales, et al. is hereby incorporated by reference.

Wireless communication between a base station and a mobile unit, such as base station 103 and mobile unit 105, is via a wireless communication link such as RF link 113. Audio information received by base station 103 from mobile unit 105 via wireless link 113 is then transmitted to system controller and switch 101 via link 109. This wireless communication is implemented utilizing spread spectrum technology with frequency hopping.

The specific requirements for the frequency hopping are set forth in a Report and Order in General Docket Number 89-354, this Report and Order being adopted by the Federal Communications Commission on Jun. 14, 1990 and released on Jul. 9, 1990. In the present embodiment, 173 channels are created in the 902-928 MHz frequency band with 8 channels used for signaling and 165 channels used for voice communication. Each active telephone call transmits voice information in a pseudo-random set of 50 channels. During an active call, voice information is transmitted by repeatedly sequencing through the set (commonly referred to as frequency hopping) with two-way voice transmission occurring for 5 milliseconds in each channel. This type of transmission is disclosed in greater detail in the U.S. patent application of M. E. Gillis, et al. "A Cordless Telephone Arranged for Operation in a Frequency Hopping System", filed Oct. 21, 1991, Ser. No. 07/779754 and assigned to the same assignee as the present application. This application of Gillis, et al. is hereby incorporated by reference.

Consider now the following example which details how a mobile unit is handed off from one base station to a second base station. Mobile unit 105 is communicating on a call with base station 104 via link 114. The operations performed to set up such a call are explained in the U.S. patent application of C. Y. Farwell, et al. "Prioritizing a Multiple Access Channel in a Wireless Telephone System", Ser. No. 07/965,504, filed on the same day as the present application and assigned to the same assignee as the present application. This application of C. Y. Farwell, et al. is hereby incorporated by reference. Mobile unit 105 is in motion and has changed its position from that shown in FIG. 1 to a position where it is now closer to base station 103 than base stations 104 or 102. Base station 104 is measuring the signal strength received from mobile unit 105 via link 114. When that signal strength drops below a certain threshold, base station 104 transmits a handoff request command to system controller and switch 101. System controller and switch 101 transmits initiate handoff commands to base stations 102 through 104. Included in the initiate handoff commands that are sent to base stations 102 and 103 is the channel hopping sequence of mobile unit 105 (as advantageously defined by a pseudo-random seed). Base station 104 is responsive to the initiate handoff command to transmit to mobile unit 105 via link 114 a start handoff message. Mobile unit 105 is responsive to the start handoff message to commence sending in the first channel of the hopping channel sequence (referred to as hopping channel 0) a synchronization pattern. In the present example, it has been assumed that the synchronization pattern is only sent in hopping channel 0; however, it can also be sent in multiple channels. This synchronization pattern is also commonly referred to as a dotting pattern. Base stations 102 and 103 by knowing the hopping sequence of mobile unit 105 utilize the synchronization pattern in hopping channel 0 to come into synchronization with mobile unit 105. (Base station 104 is already in synchronization with mobile unit 105.) Base stations 102 through 104 then monitor the signal strength from mobile unit 105 for a predetermined amount of time and transfer this signal strength information back to system controller and switch 101.

System controller and switch 101 determines which of the base stations is receiving the strongest signal. If base station 104 is receiving the strongest signal, no handoff occurs, and system controller and switch 101 transmits a start normal operation command to base station 104. Base station 104 is responsive to this command to send a stop handoff command to mobile unit 105 and to resume normal operations with mobile unit 105.

For the present example, assume that base station 103 has the strongest signal. System controller and switch 101 then transmits an end handoff command to base station 103 commanding it to take over communication with mobile unit 105 via link 113 and transmits the end handoff command to base station 104. System controller and switch 101 then ceases to send incoming audio information for mobile unit 105 to base station 104 and at the same time transmits this incoming audio information to base station 103. Simultaneously, system controller and switch 101 performs internal switching operations so that the incoming and outgoing audio information for the call is now transferred to and from base station 103 for mobile unit 105. In response to the end handoff message, base station 103 sends mobile unit 105 a stop handoff message which causes mobile unit 105 to stop transmitting the synchronization pattern in hopping channel 0, and base station 103 then enters normal communication operations with mobile unit 105. All handoff messages transmitted to mobile unit 105 are transmitted in opcode fields of the hopping channels. In response to the endoff message, base station 104 idles the radio unit that had been in operation with mobile unit 105.

Figure 2:
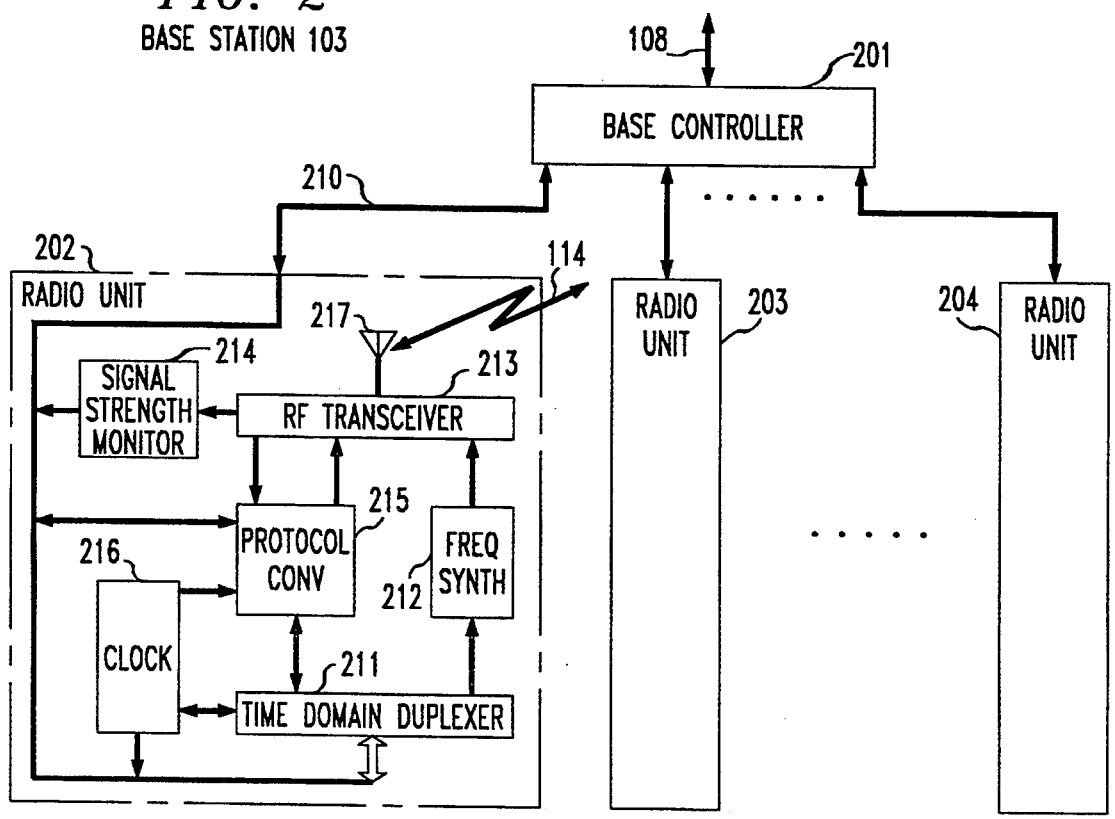
FIG. 2 is a block diagram of a base station.

FIG. 2 illustrates, in greater detail, base station 104. Base controller 201 controls the operations of radio units 202-204. Radio unit 202 is shown in detail and radio units 203-204 are similar in design. Radio unit 202 includes clock 216 for providing synchronization to time domain demultiplexer (TDD) 211 and protocol converter 215. Radio unit 202 also includes radio frequency (RF) transceiver 213, antenna 217 and frequency synthesizer 212. Transceiver 213 comprises both a RF transmitter and a RF receiver. Transceiver 213 demodulates voice signals and control signals transmitted by a mobile unit and couples the voice signals via protocol converter 215 to base controller 201 via bus 210. Base controller 201 provides all control for radio unit 202 via bus 210. Control signals received from transceiver 213 are transferred through protocol converter 215 to base controller 201 via bus 210. Protocol converter 215 is also responsive to digitally encoded voice signals received via bus 210 from base controller 201 to convert those digital voice signals into the format utilized for transmission to a mobile unit. Signal strength monitor 214 is responsive to a signal from RF transceiver 213 to arrive at a digital value representing the signal strength being received by RF transceiver 213 and to transmit this digital value to base controller 201 via bus 210.

Base controller 201 controls radio unit 202 to operate on only one channel or a hopping sequence of channels. Base controller 201 controls a hopping sequence by generating a pseudo-random data list of frequencies by using a seed in a pseudo-random generator as is well known in the art. The pseudo-randomly generated data list is transferred to TDD 211 via bus 210 by base controller 201. TDD 211 controls the frequency selected in the frequency hopping cycle by transmitting to frequency synthesizer 212 at appropriate times the values stored in the data list generated by base controller 201. TDD 212 also refreshes the frequency synthesizer 212 as the synthesizer progresses through the frequency hopping cycle. In order to have RF transceiver 213 transmit and receive on one of the dedicated channels, base controller 201 transfers a frequency data list of 50 entries to TDD 211 which contains only one frequency, e.g. the frequency of the dedicated channel. TDD 211 then controls frequency synthesizer 212 so that transceiver 213 operates on this one frequency. Clock 216 is used to achieve synchronization with the dotting pattern previously described and to achieve Big Sync based on input received from transceiver 213 and TDD 211.

Consider the previous example which was given with respect to FIG. 1 in light of the detailed block diagram of radio unit 202 of FIG. 2. Further assume, for the sake of the example, that radio unit 202 is presently in contact with mobile unit 105 via link 114. Radio unit 202 is responsive to the transmissions from mobile unit 105 as received by RF transceiver 213 to measure the signal strength utilizing signal strength monitor 214. Base controller 201 periodically reads the output from signal strength monitor 214 via bus 210. When the signal strength drops below a predetermined threshold, base controller 201 transmits this information to system controller and switch 101 via 109. In response, system controller and switch 101 transmits the initiate handoff command to all base stations. Base controller 201 is responsive to the initiate handoff command to transmit the initiate handoff message to mobile unit 105 in the opcode field of one of hopping channels. Base controller 201 transmits the message to transceiver 213 via protocol converter 215. Protocol converter 215 is responsive to signals from clock 216 and TDD 211 to send the message to transceiver 213 during one of the hopping channels for transmission. As previously described, mobile unit 105 is responsive to the initiate handoff message to start transmitting the synchronization pattern (the dotting pattern) in hopping channel 0. After transmitting the initiate handoff message, radio unit 202 functions in the same manner as if it was processing a normal call except there is no audio information in hopping channel 0; however, base controller 201 periodically reads the signal strength measurement produced by signal strength monitor 214 and transfers this signal strength information to system controller and switch 101.

Consider now how base station 103 responds to the initiate handoff request received from system controller and switch 101. Base station 103 is identical in construction to base station 104 and has radio units identical to radio units 202 through 204. For sake of discussion, the radio unit and base controller in base station 103 are referred to as radio unit 202 and base controller 201, respectively. Base controller 201 is responsive to the initiate handoff request received from system controller and switch 101 to generate a pseudo-random data list of frequencies from the seed which is transmitted from base controller 201. This pseudo-random data list of frequencies is identical to those being utilized at this time by mobile unit 105. However, clock 216 is not in synchronization with the corresponding clock in mobile unit 105. The list of frequencies is transmitted by base controller 201 to TDD 211 which controls the frequency hopping cycle of transceiver 213 via frequency synthesizer 212. Base controller 201 controls clock 216 to be responsive to the synchronization pattern in hopping channel 0 to achieve synchronization with mobile unit 105 using techniques well known in the art. Once radio unit 202 is in synchronization with mobile unit 105, base controller 201 periodically reads the strength measurement from signal strength monitor 214 under control of system controller and switch 101. Base controller 201 then reports this strength measurement to system controller and switch 101.

In the present example, the handoff of mobile unit 105 is accomplished from base station 104 to base station 103. Radio unit 202 in base station 103 is now in synchronization with mobile unit 105 and is receiving the voice information for monitoring purposes from mobile unit 105. After determining which base station should take the handoff, system controller and switch 101 transmits an end handoff message to base station 104 which controls radio unit 202 of base station 104 to terminate RF link 114 and transmits to base controller 201 of base station 103 the end handoff command which controls radio unit 202 of base station 103 to establish RF link 113. Internally, system controller and switch 101 performs the necessary operations to transfer the call from link 108 to link 109.

Figure 3:
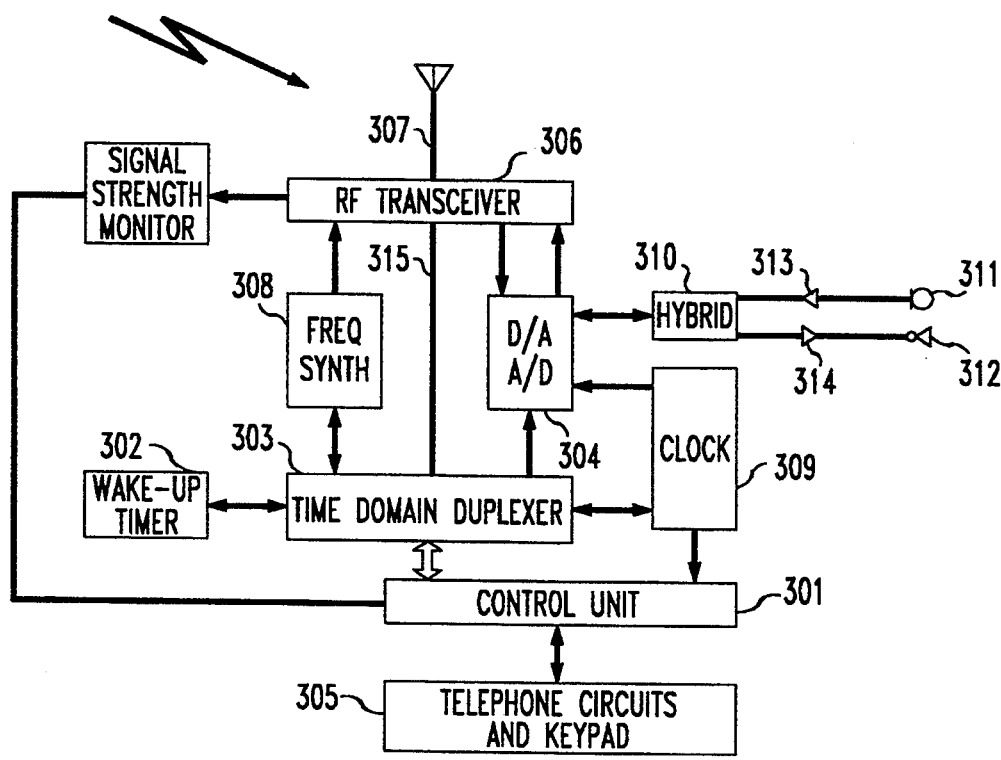
FIG. 3 is a block diagram of a mobile unit.

FIG. 3 illustrates mobile unit 105 in greater detail. Components in mobile unit 105 include control unit 301, wake-up timer 302, and clock 309 for providing synchronization to: (1) control unit 301, (2) time domain duplexer (TDD) 303 and (3) combined digital-to-analog and analog-to-digital (D/A+A/D) converter 304. Also included in mobile unit 105 are RF transceiver 306, antenna 307 and frequency synthesizer 308. Telephone circuits and keypad section 305 permits the dialing of telephone digits and actuating control keys for placing and receiving telephone calls.

Transceiver 306 comprises both an RF transmitter and an RF receiver. Transceiver 306 demodulates voice signals transmitted by a base station and couples these signals via the D/A section of converter 304 and hybrid 310 on to loudspeaker 312. Transceiver 306 receives its input analog speech signals from microphone 311. These analog speech signals are coupled to the transceiver via hybrid 310 and the A/D section of converter 304. Converter 304 converts the analog signals to a digital signals which are then transmitted to RF transceiver 306. Conventional amplifiers 313 and 314 are employed for amplifying the analog speech signals obtained from microphone 311 and provided to loudspeaker 312.

Consider now the previous example which was given with respect to FIG. 1 in light of FIG. 3. Control unit 301 of mobile unit 105 is responsive to the initiate handoff message received in the opcode field of one of the hopping channels to control TDD 303 such that it transmits to unit 304 the synchronization pattern each time hopping channel 0 occurs. Unit 304 utilizes the synchronization pattern in place of the analog information which would normally be received from hybrid 310. The result is that RF transceiver 306 transmits the synchronization pattern in hopping channel 0.

Controller 301 is then responsive to the stop handoff message received from base station 104 to stop sending the synchronization pattern in hopping channel 0. The hopping sequence does not change when mobile unit 105 is handed off from base station 104 to base station 103 since base station 103 is using the same hopping sequence as base station 104.

Figure 4:
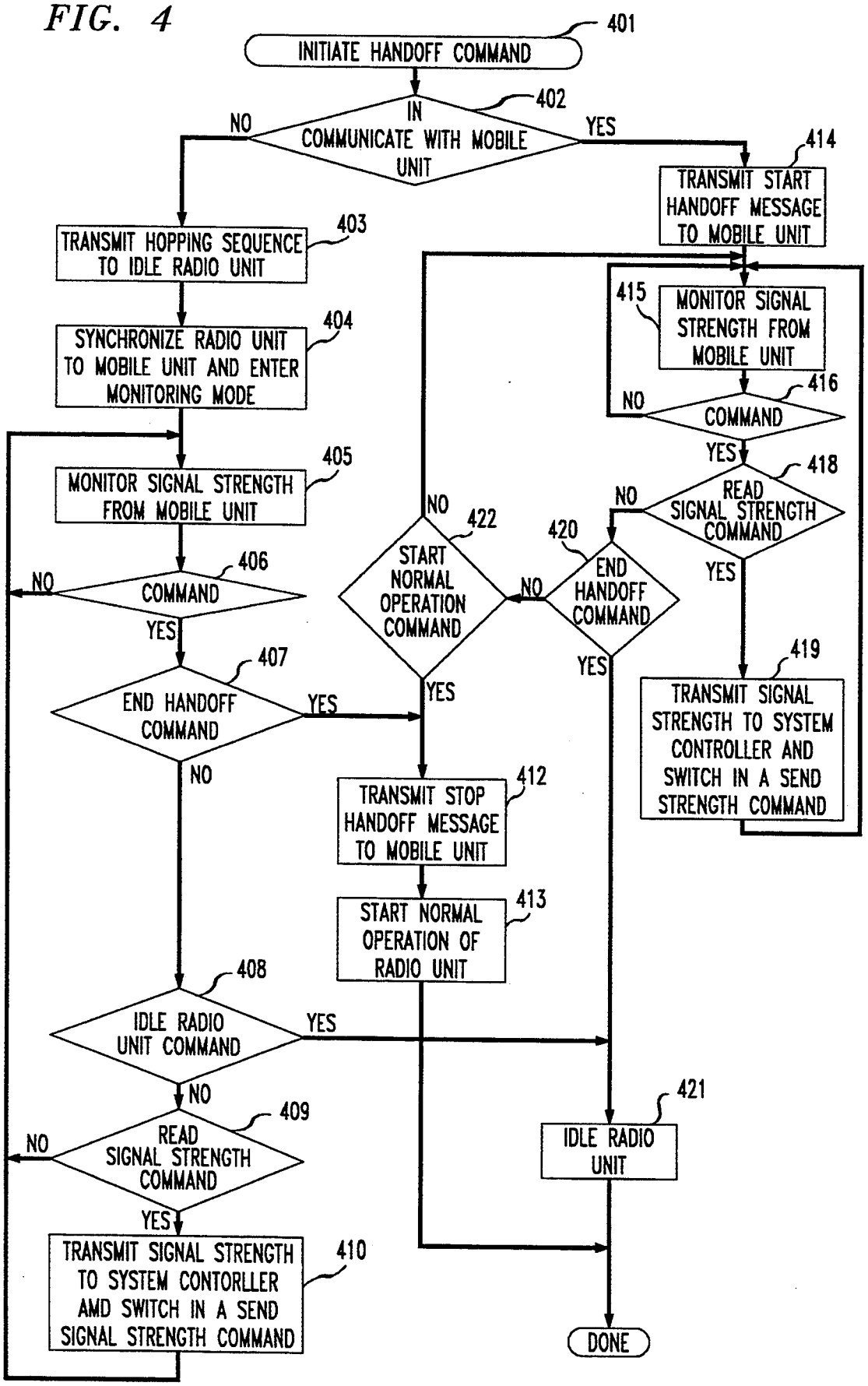
FIG. 4 illustrates, in flow chart form, the operations performed by a base unit in response to an initiate handoff command.

FIG. 4 illustrates in greater detail the actions taken by a base station during the handoff sequence. FIG. 4 shows both the actions taken by the base station which is presently in communication with the mobile unit (referred to as the active base station) as well as the actions taken by the base stations which are not presently in communication with the mobile unit (referred to as inactive base stations). Consider FIG. 4 in light of the previous example. Base station 104 is the active base station, since it is presently in communication with mobile unit 105, and base stations 102 and 103 are the inactive base stations. Inactive refers to the fact that the base station is not communicating with the mobile unit which is going through the handoff procedure. Using other radio units, these base stations may well be handling communications with other mobile units. When the initiate handoff command (which also defines the mobile unit being handed off) it is received from system controller and switch 101 in block 401, the base unit determines by execution of decision block 402 whether it is presently communicating with the mobile unit (active base unit) or is not. In the present example, when base station 104 executes decision block 402, the answer is yes, and block 414 is executed which transmits the start handoff message to mobile unit 105. The base controller also enters a mode where it transmits and receives voice information only in hopping channels 1 through 49. By repetitive execution of block 415, the base controller of base station 104 monitors and averages the signal strength from mobile unit 105.

Decision block 416 checks to see whether or not another command has been received from system controller and switch 101. If a command has not been received from system controller and switch 101, block 415 is re-executed. However, if a command has been received, decision block 418 determines if this is a read signal strength command from system controller and switch 101. If it is a read signal strength command, the base controller transmits a send signal strength command to system controller and switch 101 by execution of block 419. The send signal strength command includes the signal strength and the mobile unit identification number. System controller and switch 101 determines the time interval during which the signal strength is averaged by the time between the initiate handoff command and read signal strength command.

Returning to decision block 418, if a read signal strength command has not been received, decision block 420 determines if a end handoff command has been received. If a end handoff command has been received, the base controller in base station 104 idles the radio unit that is in communication with mobile unit 105 by execution of block 421. If a end handoff command has not been received, execution of decision block 422 determines whether a start normal operation command has been received. If the result of the test by decision block 422 is no, control is returned to block 415. However, if the result of the determination by decision block 422 is yes, then block 412 is executed which sends the stop handoff message to mobile unit 105 to stop the transmission of the synchronization pattern in hopping channel 0. Next, execution of block 413 returns the radio unit to normal operation so that voice information is communicated in all 50 of the hopping channels. System controller and switch 101 transmits a start normal operation command to the active base station if system controller and switch 101 determines from the signal strength measurements that the active base station is receiving the strongest signal from the mobile unit.

Returning to decision block 402, if the result of the decision is no which is the result for an inactive base station, the base controller transmits the hopping channel sequence to a idle radio unit in the base station by executing block 403. The remainder of the discussion of blocks 403 through 413 is given from the point of view of base station 103 which is receiving the handoff of mobile unit 105 in this example. By execution of block 404, the base controller executes the necessary operations to bring the radio unit into synchronization with mobile unit 105 and causes the radio unit to enter the monitoring mode. Next, block 405 is executed to measure the signal strength from the mobile unit in the same manner as block 415 performed this operation. Decision block 406 determines, if there is a command from system controller and switch 101; if there is no command, block 405 is reexecuted. If a command has been received, decision block 407 determines if an end handoff command has been received. If the end handoff command has been received, base station 103 transmits the stop handoff message to mobile unit 105 by execution of block 412 and then enters the normal communication operation with mobile unit 105 by execution of block 413.

Returning to decision block 407, if the result is no, the command is checked to determine whether it is the idle radio unit command. System controller and switch 101 transmits the idle radio unit command to a base station if that base station has not been selected to receive the handoff of the mobile unit. In the present example, the idle radio unit command is not received by base station 103 but is received by base station 102. If the idle radio unit command has not been received, decision block 409 determines if a read signal strength command has been received. If the answer is yes, block 410 is executed to transmit the signal strength to system controller and switch 101 utilizing the send signal strength command. Otherwise, control is transferred from decision block 409 to block 405.

Figure 5:
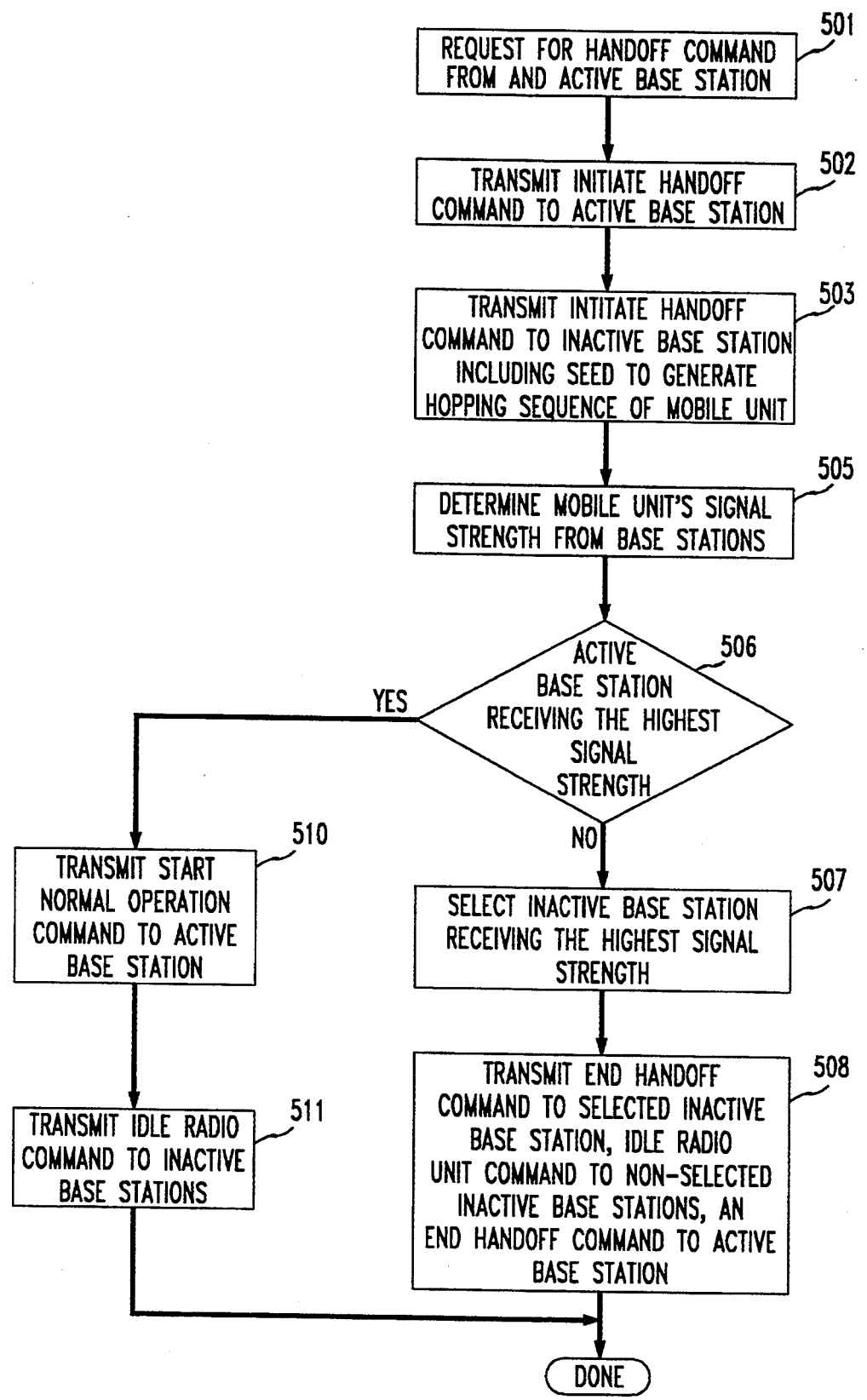
FIG. 5 illustrates, in block diagram form, the operations performed by a system controller and switch in response to a handoff request.

FIG. 5 illustrates the operations performed by system controller and switch 101 in response to a request for handoff command from an active base station (block 501). By execution of block 502, the system controller and switch 101 transmits an initiate handoff command to the active base station (in the present example base station 104). The command includes the identification number for the mobile unit. Next, execution block 503 transmits initiate handoff commands to the inactive base stations. The initiate handoff command to an inactive base station includes the seed for the hopping sequence and identification number of the mobile unit.

Block 505 obtains the mobile signal strength as measured by each of the base stations by transmission of read signal strength commands and reception of send signal strength commands. Decision block 506 determines whether the active base station is receiving the highest signal strength in which case no handoff operation is performed. If the result of decision block 506 is yes, block 510 is executed resulting in the transmission of the start normal operation command to the active base station. Finally, block 511 is executed which results in idle radio commands being transmitted to the inactive base stations.

Returning to decision block 506. If the active base station is not receiving the highest signal strength, then block 507 is executed to select the inactive base station receiving the highest signal strength. By execution of block 508, system controller and switch 101 transmits end handoff commands to the selected inactive station and the active station with idle radio unit commands being transmitted to the non-selected inactive base stations. Execution of block 508 results in the mobile unit being in communication with the selected inactive unit and the communication link being dropped between the mobile unit and the active base station which is now inactive with respect to that mobile unit.

Figure 6:
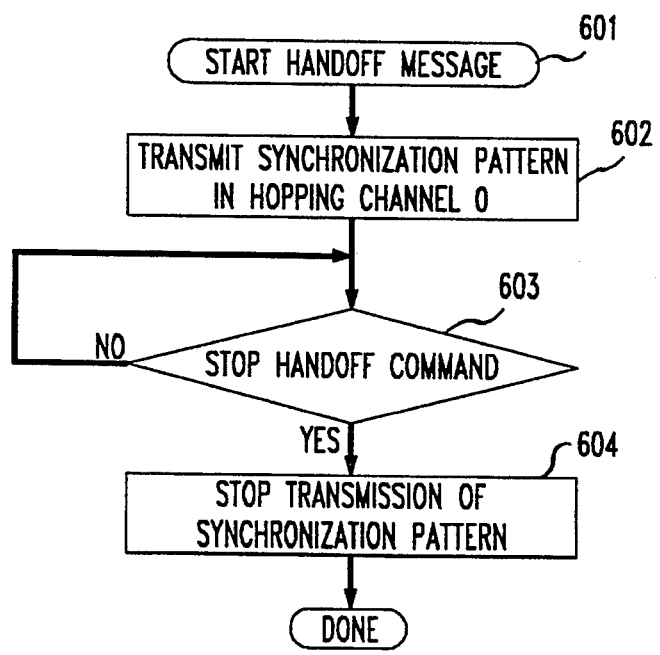
FIG. 6 illustrates, in flow chart form, the operations performed by a mobile unit in response to a handoff message.

FIG. 6 illustrates the operations performed by a mobile unit in response to a start handoff message. In response to the start handoff message, the mobile unit begins to transmit the synchronization pattern in hopping channel 0 and continues to encode the voice information in the remaining 49 hopping channels. Decision block 603 determines when the stop handoff command has been received. Once the stop handoff command has been received, block 604 stops the transmission of the synchronization pattern and returns the mobile unit to normal operation where all 50 of the hopping channels are utilized for voice communication.

Figure 7:
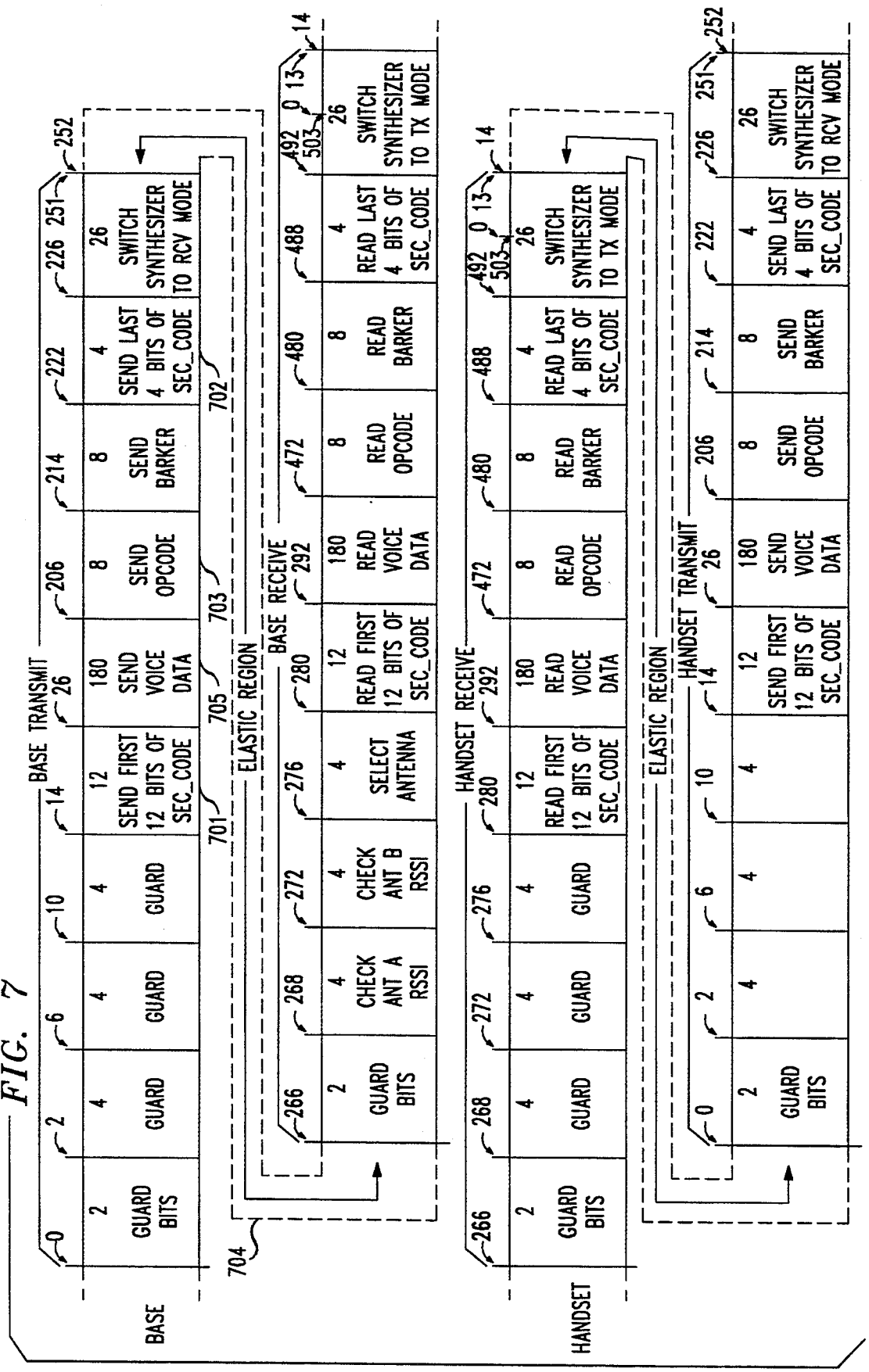
FIG. 7 illustrates the information that is transmitted in each hopping channel.

FIG. 7 illustrates the information that is transmitted each time within a hopping channel. First, the base station transmits and the handset receives for 2.5 milliseconds, and then the mobile unit transmits and the base station receives for 2.5 milliseconds. Note, that elastic region 704 is time allowed for transmission delay of radio waves. Fields 701 and 702 define the mobile unit's identification code. Voice is transmitted in field 705. The different operational messages, e.g., start handoff message, are transmitted in field 703. The remaining fields are similar to those just described.

We claim:

1. A method of controlling a transfer of a wireless mobile unit from a first one of a plurality of wireless base stations to a second one of the plurality of wireless base stations in a wireless system and the wireless system having a switching controller and voice information is communicated between the wireless mobile unit and the first and second ones of wireless base stations is transmitted in an individual set of frequency channels, the method comprises the steps of:

detecting the need for a transfer of the wireless mobile unit by the first one of the wireless base stations and transmitting a transfer request message to the switching controller;

transmitting initiate transfer messages to the wireless base stations by the switching controller in response to the transfer request message;

signaling the wireless mobile unit to start transmission of synchronization information in a subset of the individual set of the frequency hopping channels with remaining frequency hopping channels transmitting the voice information by the first one of the wireless base stations in response to one of the initiate transfer messages;

synchronizing to the wireless mobile unit using the synchronization information by the remaining ones of the wireless base stations in response to the initiate transfer messages;

measuring the signal strength of the wireless mobile unit by each of the wireless base stations and transmitting the signal strength measurements to the switching controller by each of the wireless base stations; and selecting the second one of the wireless base stations to receive the transfer of the wireless mobile unit from the first one of the wireless base stations by the switching controller in response to the signal strength measurements received from the wireless base stations.

2. The method of claim 1 wherein the step of selecting comprises the steps of transmitting an end transfer message to the second one of the wireless base stations; and signaling the wireless mobile unit to stop transmitting the synchronization information in the subset of the individual set of the frequency hopping channels and to transmit voice information in all of the individual set of the frequency hopping channels by the second one of the wireless base stations in response to the end transfer message whereby the synchronization information is only transmitted during the transfer procedure.

3. The method of claim 2 wherein the step of selecting further comprises the step of transmitting stop transfer message to the first one and remaining ones of the wireless base stations;

discontinuing the call with the wireless mobile unit and stopping the signal strength measurement by the first one of the wireless base stations in response to one of the stop transfer messages; and stopping the signal strength measurements by the remaining ones of the wireless base stations in response to the stop transfer messages.

4. A method for controlling the transfer of a wireless mobile unit from a first one of a plurality of wireless base stations which is communicate call information with the wireless mobile unit in a wireless system and the wireless system having a switching controller and voice information is communicated between the wireless mobile unit and the first and second ones of wireless base stations is transmitted in an individual set of frequency hopping channels, the method comprises the steps of:

starting transmission of a synchronization pattern in a subset of the individual set of the frequency hopping channels with remaining frequency hopping channels transmitting the voice information by the wireless mobile unit in response to a start transfer command from the first one of the wireless base stations whereby the synchronization pattern allows other ones of the wireless base stations to become synchronized with the wireless mobile unit; and discontinuing transmission of the synchronization pattern in the subset of the individual set of the frequency bopping channels and transmitting voice information in all of the individual set of the frequency hopping channels by the wireless mobile unit in response to a stop command whereby the synchronization information is only transmitted during the transfer procedure.

5. An apparatus for controlling a transfer of a wireless mobile unit from a first one of a plurality of wireless base stations which is communicating a call with the wireless mobile unit in a wireless system and the wireless system having a switching controller and voice information is communicated between the wireless mobile unit and the first and second ones of wireless base stations is transmitted in an individual set of frequency channels, the apparatus comprises:

means in the first one of the wireless base stations for detecting the need for a transfer of the wireless mobile unit and transmitting a transfer request message to the switching controller;

means in the switching controller for transmitting initiate transfer messages to the wireless base stations in response to the transfer request message;

means in the first one of the wireless base stations for signaling the wireless mobile unit to start transmission of synchronization information in a subset of the individual set of the frequency hopping channels with remaining frequency hopping channels transmitting the voice information in response to one of the initiate transfer messages;

means in the remaining ones of the wireless base stations for synchronizing to the wireless mobile unit using the synchronization information in response to the initiate transfer messages;

means in each of the wireless base stations for measuring the signal strength of the wireless mobile unit and transmitting the signal strength measurements to the switching controller, and means in the switching controller for selecting a second one of the wireless base stations to receive the transfer of the wireless mobile unit from the first one of the wireless base stations in response to the signal strength measurements received from the wireless base stations.

6. The apparatus of claim 5 wherein the selecting means comprises means for transmitting an end transfer message to the second one of the wireless base stations; and means in the second one of the wireless base stations for signaling the wireless mobile unit to stop transmitting the synchronization information in the subset of the individual set of the frequency hopping channels and to transmit voice information in all of the individual set of the frequency hopping channels in response to the end transfer message whereby the synchronization information is only transmitted during the transfer procedure.

7. The apparatus of claim 6 wherein the s electing means further comprises means for transmitting stop transfer messages to the first one and remaining ones of the wireless base stations;

means in the first one of the wireless base stations for discontinuing the call with the wireless mobile unit and stopping the signal strength measurement in response to one of the stop transfer messages; and means in the remaining ones of the wireless base stations for stopping the signal strength measurements in response to the stop transfer messages.

8. An apparatus for controlling the transfer of a wireless mobile unit from a first one of a plurality of wireless base stations which is communicate call information with the wireless mobile unit in a wireless system and the wireless system having a switching controller and voice information is communicated between the wireless mobile unit and the first and second ones of wireless base stations is transmitted in an individual set of frequency channels, the apparatus comprises:

means in the wireless mobile unit for starting transmission of a synchronization pattern in a subset of the individual set of the frequency hopping channels with remaining frequency hopping channels transmitting the voice information in response to a start transfer command from the first one of the wireless base stations whereby the synchronization pattern allows other ones of the wireless base stations to become synchronized with the wireless mobile unit; and means in the wireless mobile unit for discontinuing transmission of the synchronization pattern in the subset of the individual set of the frequency hopping channels and for transmitting voice information in all of the individual set of the frequency hopping channels in response to a stop command whereby the synchronization information is only transmitted during the transfer procedure.

* * * * *